No. 734,831. Patented July 28, 1903.

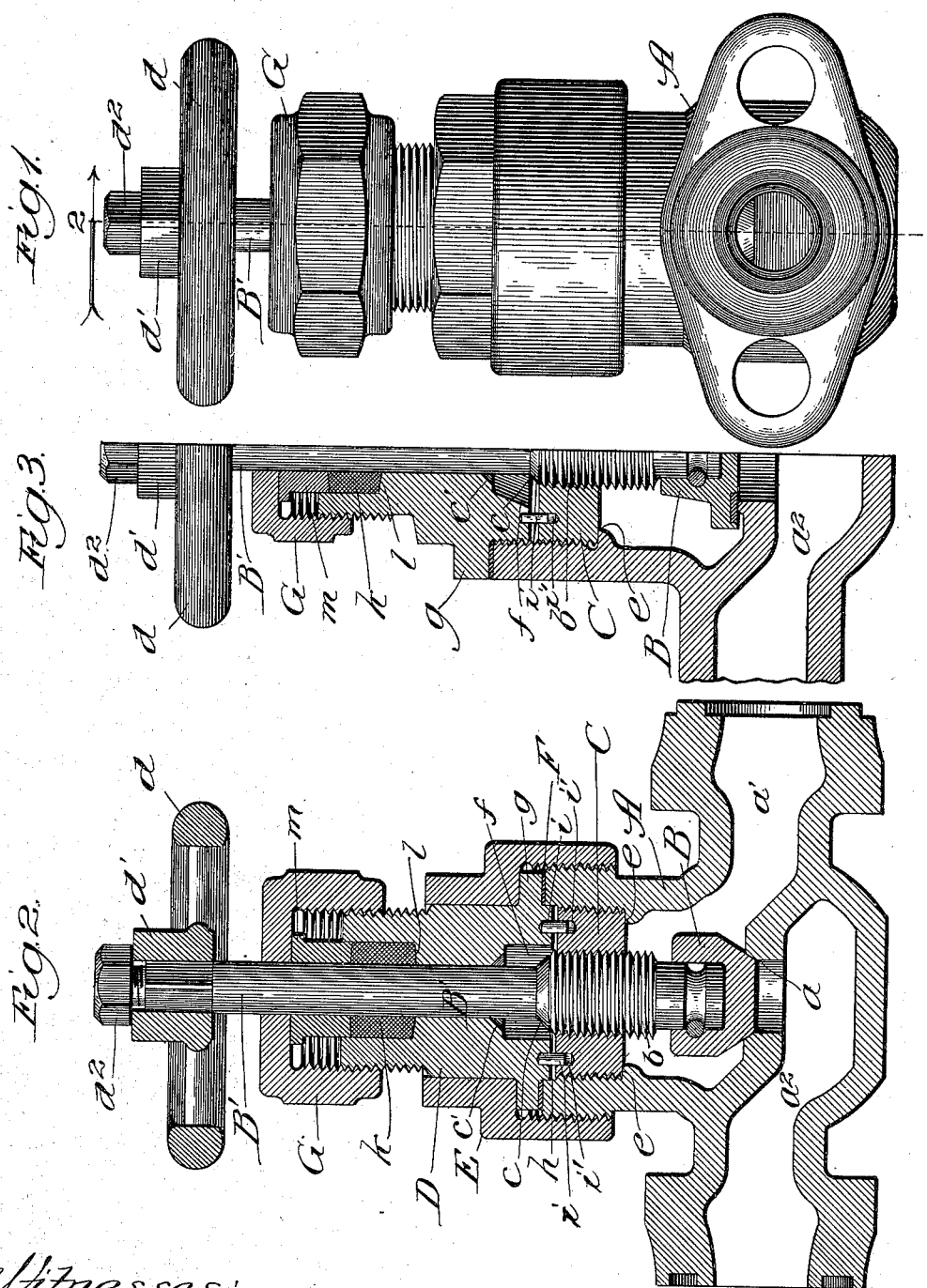

UNITED STATES PATENT OFFICE.

CHARLES J. DIEDERICH, OF CHICAGO, ILLINOIS.

VALVE DEVICE.

SPECIFICATION forming part of Letters Patent No. 734,831, dated July 28, 1903.

Application filed March 25, 1903. Serial No. 149,441. (No model.)

*To all whom it may concern:*

Be it known that I, CHARLES J. DIEDERICH, a citizen of the United States, residing at Chicago, in the county of Cook and State of Illinois, have invented a new and useful Improvement in Valve Devices, of which the following is a specification.

My invention relates to an improvement in the class of valve devices for controlling high pressures, such as the pressure of ammonia-gas in ice and refrigerating machines, steam and other fluid pressure; and the primary object of my invention is to provide an improved construction of valve device that shall cause it to remain tight and prevent it from leaking with use.

Referring to the accompanying drawings, Figure 1 shows my improved valve device by a view in elevation. Fig. 2 is a section taken at the line 2 on Fig. 1 and viewed in the direction of arrow, and Fig. 3 a broken central longitudinal section taken through the half of the valve device presented by Fig. 2 and showing a modification.

A is the casing, containing the fluid-passage formed of the two sections $a'$ and $a^2$, communicating through a valve-seat $a$.

B is the valve fitting the seat $a$ and provided with a stem B′, having an expanded threaded section $b$, terminating at its outer end in a tapering supplemental valve $c$ for a purpose hereinafter described. On its outer flattened end the valve-stem carries a hand-wheel $d$, having a square or otherwise angular boss $d'$ extending from it, against which a nut $d^2$ is screwed upon the threaded extremity of the stem for securing the hand-wheel in place.

C is a nut screwed into the casing A against an annular shoulder $e$ therein at the inner end of the passage-section $a'$ and into which the threaded stem-section $b$ screws to cause the nut to form the bearing for the valve-stem.

D is the stuffing-box body surrounding the valve-stem beyond its threaded section $b$. At the inner end of the stuffing-box body is a recess $f$, tapering outwardly at its outer end to form about the stem a seat $c'$ for the supplemental valve $c$. About the recess $f$ the body D is provided, according to the construction illustrated in Fig. 2, with a flange $g$, at which it seats against the annular end of the casing upon an interposed rubber or soft-metal gasket F, and at which flange it is secured in place by a shouldered cap-nut E, screwing upon the externally-threaded end of the casing to bear its shoulder against the flange $g$. According to the modified construction represented in Fig. 3, which is employed in the larger sizes of the valve device, the cap-nut is omitted and the stuffing-box body D is threaded externally below or inward relative to the flange $g$ to screw into the casing. In each of the described constructions, with the nut C screwed against the shoulder $e$ and the stuffing-box body, bearing at its flange $g$ against the gasket F, a space $h$ of about the width of the thickness of the gasket is provided between the nut and the inner end of the body D to prevent contact between them, and in each construction illustrated pins $i$ depend from the inner annular end of the stuffing-box body to enter sockets $i'$ in the nut C and afford a medium for adapting said body to be employed as the means for screwing the nut home and unscrewing it, and particularly for holding the nut against turning by turning the stem. The outer end of the stuffing-box body, which is externally threaded, as shown, has a recess $l$ formed in it about the valve-stem to contain packing $k$, against which a gland $m$ is confined by a cap-nut G, screwed upon the body D, to afford a stuffing-box.

From the foregoing description of the construction it will be seen that the bearing for the valve-stem afforded by the nut C is quite independent of the stuffing-box body, so that all the strain of pressure against the valve B is exerted through the valve-stem and its bearing-nut against the valve-casing, and none is exerted against the body D, so that its tight seating at the gasket F cannot be impaired by any degree of pressure against the valve. By providing the space $h$ between the body D and nut C no strain exerted against the nut tending to force it outward can effect the packed junction of the stuffing-box body with the casing. The square boss $d'$ on the outer end of the valve-stem adapts it for the application of a wrench to turn it for seating the valve, which is adjustable relative to its seat by turning the stem to work its screw-section $b$ in the bearing-nut C. When the valve device requires repacking in the recess $l$, the work may be done without causing leakage, as of ammonia-gas, along the stem by withdrawing the latter until its supplemental valve c enters tightly into its seat c', whereby the valve device is sealed.

While pins i are shown depending from the body D and entering sockets i' in the bearing-nut C to afford means for turning it through the medium of said body and for holding it, other abutting means for the purpose may be provided between the nut and stuffing-box body, and the devices may be further modified in matters of detail without departure from my invention.

What I claim as new, and desire to secure by Letters Patent, is—

1. In a valve device, the combination with the casing, containing a valve-seat in its passage, of a valve-stem carrying the valve for said seat and having a threaded section, a nut screwing into said casing and forming the valve-stem bearing into which said threaded section screws, and a flanged stuffing-box body, through which the valve-stem extends, seating at its flanges on the casing against an interposed gasket to be independent of said bearing.

2. In a valve device, the combination with the casing containing a valve-seat in its passage, of a valve-stem carrying the valve for said seat and having an expanded threaded section, a nut screwing into said casing and forming the valve-stem bearing into which said threaded section screws, and a flanged stuffing-box body, through which the valve-stem extends, seating at its flange on the casing against an interposed gasket to be independent of said bearing and forming a space separating said body and nut.

3. In a valve device, the combination with a casing containing a valve-seat in its passage, of a valve-stem carrying the valve for said seat and having an expanded threaded section terminating at its outer end in a supplemental valve, a nut screwing into said casing and forming the valve-stem bearing into which said threaded section screws, and a flanged stuffing-box body, through which the valve-stem extends, having a recess in its inner end terminating in a seat for said supplemental valve, said body seating at its flange on the casing against an interposed gasket to be independent of said bearing and forming a space separating said body and nut.

4. In a valve device, the combination with the casing containing a valve-seat in its passage, of a valve-stem carrying the valve for said seat and having an expanded threaded section, a nut screwing into said casing and forming the valve-stem bearing into which said threaded section screws, a flanged stuffing-box body through which the valve-stem extends, seating at its flange on the casing against an interposed gasket to be independent of said bearing and forming a space separating said body and nut, and engaging means between the opposing surfaces of said body and nut.

5. In a valve device, the combination with the casing containing a valve-seat in its passage, of a valve-stem carrying the valve for said seat and having an expanded threaded section, a nut screwing into said casing, provided in its outer face with sockets and forming the valve-stem bearing into which said threaded section screws, a flanged stuffing-box body through which the valve-stem extends, seating at its flange on the casing against an interposed gasket to be independent of said bearing and forming a space separating said body and nut, pins on the inner face of said body to enter said sockets, and an internally-shouldered cap-nut screwing upon said casing about the stuffing-box body to engage its shoulder with said flange.

6. A valve device comprising, in combination, a casing containing a valve-seat in its passage, a valve-stem carrying the valve for said seat and having an expanded threaded section terminating at its outer end in a supplemental valve, a nut screwing into said casing and forming the valve-stem bearing into which said threaded section screws, a flanged stuffing-box body through which the valve-stem extends, having a recess in its inner end terminating in a seat for said supplemental valve, said body seating at its flange on the casing against an interposed gasket to be independent of said bearing and forming a space separating said body and nut, sockets in said nut and pins extending from said body to enter the sockets, an internally-shouldered cap-nut screwing upon said casing about the stuffing-box body to engage its shoulder with said flange, a stuffing-box about the valve-stem in the outer end of said body, a cap screwed upon said body about the stem and covering said stuffing-box, and a handwheel on the outer end of the valve-stem provided with an angular boss.

CHARLES J. DIEDERICH.

In presence of—
L. HEISLAR,
WALTER N. WINBERG.